(12) United States Patent
Koberg et al.

(10) Patent No.: US 11,479,939 B2
(45) Date of Patent: Oct. 25, 2022

(54) SLOT LOCK CRIBBING BLOCK

(71) Applicant: DICA MARKETING COMPANY, Guthrie Center, IA (US)

(72) Inventors: Kris Koberg, Cedar Rapids, IA (US); Bob Olsem, Worthington, MN (US); Joel Atchison, Worthington, MN (US)

(73) Assignee: DICA MARKETING COMPANY, Guthrie Center, IA (US)

( * ) Notice: Subject to any disclaimer, the term of this patent is extended or adjusted under 35 U.S.C. 154(b) by 108 days.

(21) Appl. No.: 17/101,890

(22) Filed: Nov. 23, 2020

(65) Prior Publication Data
US 2021/0156105 A1    May 27, 2021

Related U.S. Application Data

(60) Provisional application No. 62/940,706, filed on Nov. 26, 2019.

(51) Int. Cl.
*E02D 27/44* (2006.01)
*F16M 11/22* (2006.01)

(52) U.S. Cl.
CPC .............. *E02D 27/44* (2013.01); *F16M 11/22* (2013.01); *E02D 2250/0015* (2013.01);
(Continued)

(58) Field of Classification Search
CPC combination set(s) only.
See application file for complete search history.

(56) References Cited

U.S. PATENT DOCUMENTS 1,703,303 A * 2/1929 Fitzgerald ........... E02D 29/0216
                                                        405/273
1,773,579 A * 8/1930 Flath .................... E02D 29/0216
                                                        405/273
(Continued)

FOREIGN PATENT DOCUMENTS

| GB | 2306527 A | * | 5/1997 | ............. E21D 15/04 |
| GB | 2335678 A | * | 9/1999 | ............. E21D 15/04 |
| GB | 2353052 A | * | 2/2001 | ............. E21D 15/48 |

OTHER PUBLICATIONS

Turtle Plastics—Cura Crib Products Jan. 1, 2019.
(Continued)

*Primary Examiner* — Monica E Millner
(74) *Attorney, Agent, or Firm* — Christopher A. Proskey; BrownWinick Law Firm

(57) ABSTRACT

In one or more arrangements, a stackable pad system is provided. The system has a plurality of blocks with each block having a flat upper surface with an upward extending lip positioned at opposing ends of the flat upper surface. Each block has a flat lower surface with a downward extending lip positioned at opposing ends of the flat lower surface. In some arrangements, the system includes a bottom locking plate and a top locking plate. When placed together, in a stacked arrangement, wherein a bottom most pair of blocks are stacked on top of the bottom locking plate with bottom lips fitting within the recesses of the bottom locking plate, additional pairs of blocks are stacked on the first pair of blocks and the top locking plate placed on the top most pair blocks, the blocks are all locked together and resist shifting and movement.

25 Claims, 16 Drawing Sheets

(52) U.S. Cl.
CPC ............... *E02D 2300/0001* (2013.01); *E02D 2300/0006* (2013.01); *E02D 2300/0014* (2013.01); *E02D 2300/0046* (2013.01); *F16M 2200/08* (2013.01)

(56) References Cited

U.S. PATENT DOCUMENTS

| | | | | |
|---|---|---|---|---|
| 1,787,199 | A * | 12/1930 | Huntoonjohn | E02D 29/0216 |
| | | | | 405/273 |
| 2,123,016 | A * | 7/1938 | William | E02D 29/0216 |
| | | | | 405/273 |
| 2,197,960 | A * | 4/1940 | Alexander | E02D 29/0216 |
| | | | | 405/273 |
| 2,315,441 | A * | 3/1943 | McDaniel | E02D 29/0216 |
| | | | | 52/645 |
| 3,464,211 | A * | 9/1969 | Andresen | E02D 29/0266 |
| | | | | 405/262 |
| 3,631,682 | A * | 1/1972 | Hilfiker | E02D 29/0216 |
| | | | | 405/273 |
| 4,068,482 | A * | 1/1978 | Hilfiker | E02D 29/0266 |
| | | | | D25/113 |
| 4,073,454 | A | 2/1978 | Sauber | |
| 4,840,003 | A * | 6/1989 | Lucas | E04B 2/702 |
| | | | | 52/286 |
| 4,997,315 | A * | 3/1991 | Clark | E02D 29/0216 |
| | | | | 405/284 |
| 5,746,547 | A | 5/1998 | Reinmann et al. | |
| 6,079,910 | A * | 6/2000 | Marianski | E21D 15/48 |
| | | | | 52/233 |
| 6,250,849 | B1 | 6/2001 | Marianski et al. | |
| 6,352,392 | B1 | 3/2002 | McCartney | |
| 6,354,569 | B1 * | 3/2002 | Gioia | B66F 3/00 |
| | | | | 254/131 |
| 7,841,805 | B2 * | 11/2010 | Chugh | E21D 15/02 |
| | | | | 405/288 |
| D804,768 | S | 12/2017 | Norton | |
| 11,015,316 | B1 * | 5/2021 | Norton | F16M 11/22 |
| 2003/0068204 | A1 * | 4/2003 | Paton-Ash | E21D 15/483 |
| | | | | 405/273 |
| 2006/0002770 | A1 * | 1/2006 | Paton-Ash | E21D 15/483 |
| | | | | 405/289 |
| 2009/0026427 | A1 * | 1/2009 | McCallum | B66F 3/12 |
| | | | | 254/104 |
| 2012/0032056 | A1 | 2/2012 | Mora | |

OTHER PUBLICATIONS

Outrigger Pads—Ecocrib Cribbing Block Jul. 1, 2019.
Redwood Plastics—Redco Dura Crib and Dura Stat Nov. 1, 2015.
AME Intl.—Super Stacker Cribbing Blocks May 17, 2018.
Strata Worldwide—Link-N-Lock Jan. 1, 2019.

* cited by examiner

SLOT LOCK CRIBBING BLOCK

CROSS-REFERENCE TO RELATED APPLICATIONS

The present application claims priority to U.S. Provisional Application No. 62/940,706, titled SLOT LOCK CRIBBING BLOCK, and filed on Nov. 26, 2019, the entirety of which is hereby incorporated by reference herein in its entirety, including any figures, tables, or drawings or other information.

FIELD OF THE DISCLOSURE

This disclosure relates to pads for supporting outrigger arms of trucks and other vehicles and equipment. More specifically and without limitation, this disclosure relates to a stacking system for pads that provide additional height for supporting outriggers.

OVERVIEW OF THE DISCLOSURE

Outriggers are old and well known in the art and are frequently used to provide additional stability to cranes, boom trucks, aerial work platforms, and the like. There are countless types, forms and designs of outriggers known in the art. Generally speaking, these outriggers extend outward from the body of the vehicle or equipment and engage the ground thereby giving a greater base of stability which increases safety and allows the vehicle or equipment to move heavier loads.

In many situations, especially when the ground is uneven, it is necessary to provide some kind of support under the outriggers. This may be because the outrigger cannot reach the ground due to the slope of the ground at the location of the vehicle or equipment. When this happens, users tend to put anything they can find under the outrigger to fill the gap between the bottom of the outrigger and the ground. This may include using logs, rocks, boards, jacks or any other item that is available and convenient. Unfortunately, many times the items that are selected to transfer the weight to the ground are less than optimal from a strength or stability standpoint.

That is, many times items are used that have an unknown or even questionable structural integrity. That is, it is unknown if the item or items that are used to bridge the gap between the bottom of the outrigger and the ground has the strength and structural integrity to support the load applied to it. If the item fails, like a board breaking or a rock crushing, or the like, the vehicle or equipment can shift, tilt or fall thereby causing damage and/or injury, which is of course highly undesirable.

Similarly, many times items are used that provide an unknown or even questionable amount of stability. That is, it is unknown how the item or items that are used to bridge the gap between the bottom of the outrigger and the ground will react under pressure and dynamic forces and if there are any shifts in the load. It is also unknown what the amount of grip, or the coefficient of friction, is between the bottom of the outrigger and the ground. This is particularly true when multiple items are stacked on top of one another to bridge the gap between the outrigger and the ground. If the item or items shift, slide or move relative to the ground and/or the outrigger the vehicle or equipment can shift, tilt or fall thereby causing damage and/or injury, which is of course highly undesirable.

Notably, one approach is discussed in U.S. Pat. No. 6,352,392 entitled "Mine Roof Support Crib Having Only Two or Three Planes, and Method," issued on Mar. 5, 2002, which is fully incorporated by reference herein. In this application, a cribbing system is provided; however, such a cribbing system fails to provide maximum contact area for the outrigger, as well as fails to eliminate gaps within the system, thus compromising the stability of the overall cribbing system.

As such, problems and challenges remain within the state of the art that remain unsolved.

Thus it is a primary object of the disclosure to provide a cribbing block system that improves upon the state of the art.

Another object of the disclosure is to provide a cribbing block system that reduces cost over existing arrangements.

Yet another object of the disclosure is to provide a cribbing block system that facilitates the use of slot locking for increased stability.

Another object of the disclosure is to provide a cribbing block system that allows for the use of multiple pairs of blocks to achieve a desired height.

Yet another object of the disclosure is to provide a cribbing block system that facilitates secure connections between pairs of blocks.

Another object of the disclosure is to provide a cribbing block system that facilitates use of less expensive components.

Yet another object of the disclosure is to provide a cribbing block system that reduces the complexity of the manufacturing process.

Another object of the disclosure is to provide a cribbing block system that reduces the amount of time required for manufacture.

Yet another object of the disclosure is to provide a cribbing block system that reduces the amount of machine time required to manufacture the product.

Yet another object of the disclosure is to provide a cribbing block system that is easy to assemble.

Another object of the disclosure is to provide a cribbing block system that has a relatively foolproof design.

Yet another object of the disclosure is to provide a cribbing block system that reduces the potential for toppling or falling of outriggers.

Another object of the disclosure is to provide a cribbing block system that is easy to use.

Yet another object of the disclosure is to provide a cribbing block system that is simple in design.

Another object of the disclosure is to provide a cribbing block system that is relatively inexpensive or affordable.

Yet another object of the disclosure is to provide a cribbing block system that has a minimum number of parts.

Another object of the disclosure is to provide a cribbing block system that can be used with multiple materials of construction.

Yet another object of the disclosure is to provide a cribbing block system that facilitates operation in a number of diverse environments.

Another object of the disclosure is to provide a cribbing block system that provides increased grip.

Yet another object of the disclosure is to provide a cribbing block system that provides increased strength.

Another object of the disclosure is to provide a cribbing block system that can be used with practically any vehicle or piece of equipment.

Yet another object of the disclosure is to provide a cribbing block system that can be made of any size.

Another object of the disclosure is to provide a cribbing block system that has known structural properties.

Yet another object of the disclosure is to provide a cribbing block system that has known stability properties.

Another object of the disclosure is to provide a cribbing block system that is easy to deploy.

Yet another object of the disclosure is to provide a cribbing block system that can be deployed by hand by a single user.

Another object of the disclosure is to provide a cribbing block system that can be assembled to varying heights.

Yet another object of the disclosure is to provide a cribbing block system that has locking and self-reinforcing features that provide unmatched stability and strength.

Another object of the disclosure is to provide a cribbing block system that improves safety.

Yet another object of the disclosure is to provide a cribbing block system that reduces injuries.

Another object of the disclosure is to provide a cribbing block system that provides increased confidence to a user in the setup of their equipment.

Yet another object of the disclosure is to provide a cribbing block system that provides increased grip over prior art systems.

These and other objects, features, or advantages of the present disclosure will become apparent from the specification, claims and drawings.

SUMMARY OF THE DISCLOSURE

In one or more arrangements, a stackable pad system is provided. The system has a plurality of blocks with each block having a flat upper surface with an upward extending lip positioned at opposing ends of the flat upper surface. Each block has a flat lower surface with a downward extending lip positioned at opposing ends of the flat lower surface. The system includes a bottom locking plate and a top locking plate. The bottom locking plate has a flat upper surface and a downward extending recess positioned at opposing ends of the flat upper surface. A first pair of blocks is configured to be stacked in side by side alignment on the bottom locking plate such that the downward extending lips of the first pair of blocks are received in the downward extending recesses of the bottom locking plate, and the flat lower surface of the first pair of blocks engages the flat upper surface of the bottom locking plate. The top locking plate has a flat upper surface and a flat bottom surface. The flat bottom surface of the top locking plate is configured to be placed on the flat upper surface of a pair of side by side blocks between the pair of upward extending lips. When placed together, in a stacked arrangement, wherein a first pair of blocks are stacked on top of the bottom locking plate, and a second pair of blocks are stacked on the first pair of blocks and a locking plate is placed on top of the second pair of blocks, the blocks are all locked together and resist shifting and movement due to the bottom lips of the first pair of blocks fitting within the recesses in the bottom locking plate, the first pair of blocks and second pair of blocks locking to one another with their upward extending lips and downward extending lips, respectively, and the top locking plate fitting between the upward extending lips of the second pair of block.

DETAILED DESCRIPTION OF THE DISCLOSURE

Figure 1:
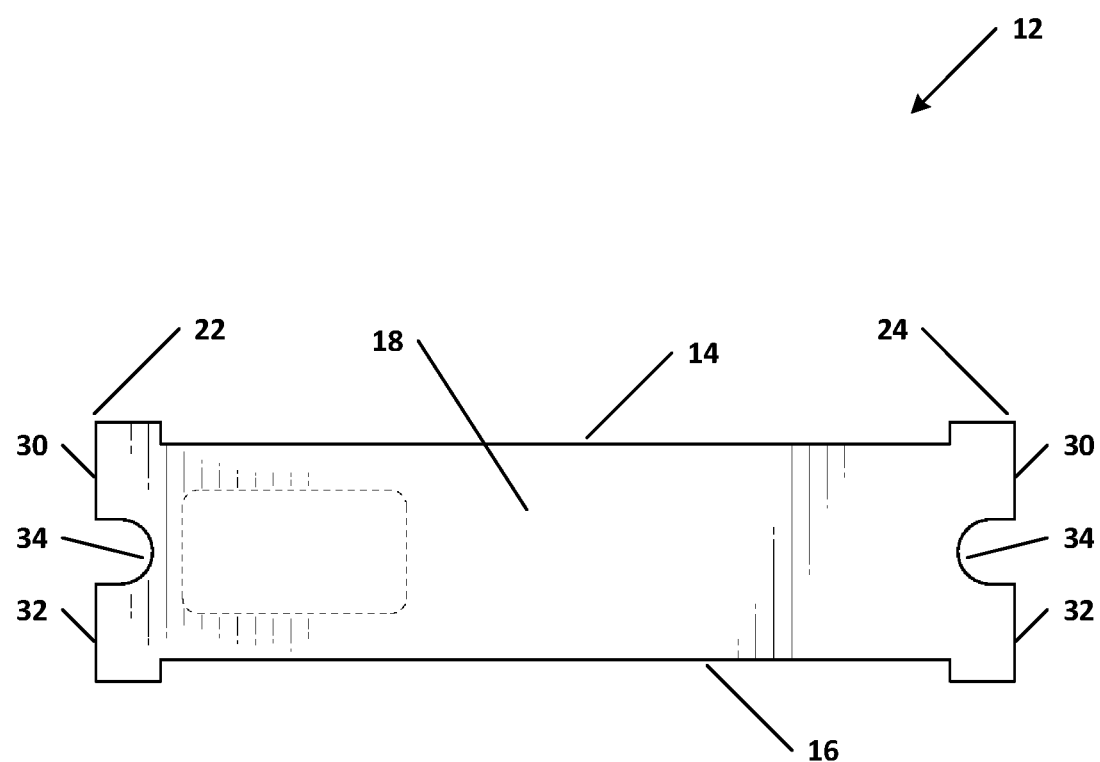
FIG. 1 is a front view of a slot lock cribbing block which, along with other slot lock cribbing blocks, provides a heightened platform for outrigger stabilizers or feet, in accordance with one or more embodiments.
Figure 2:
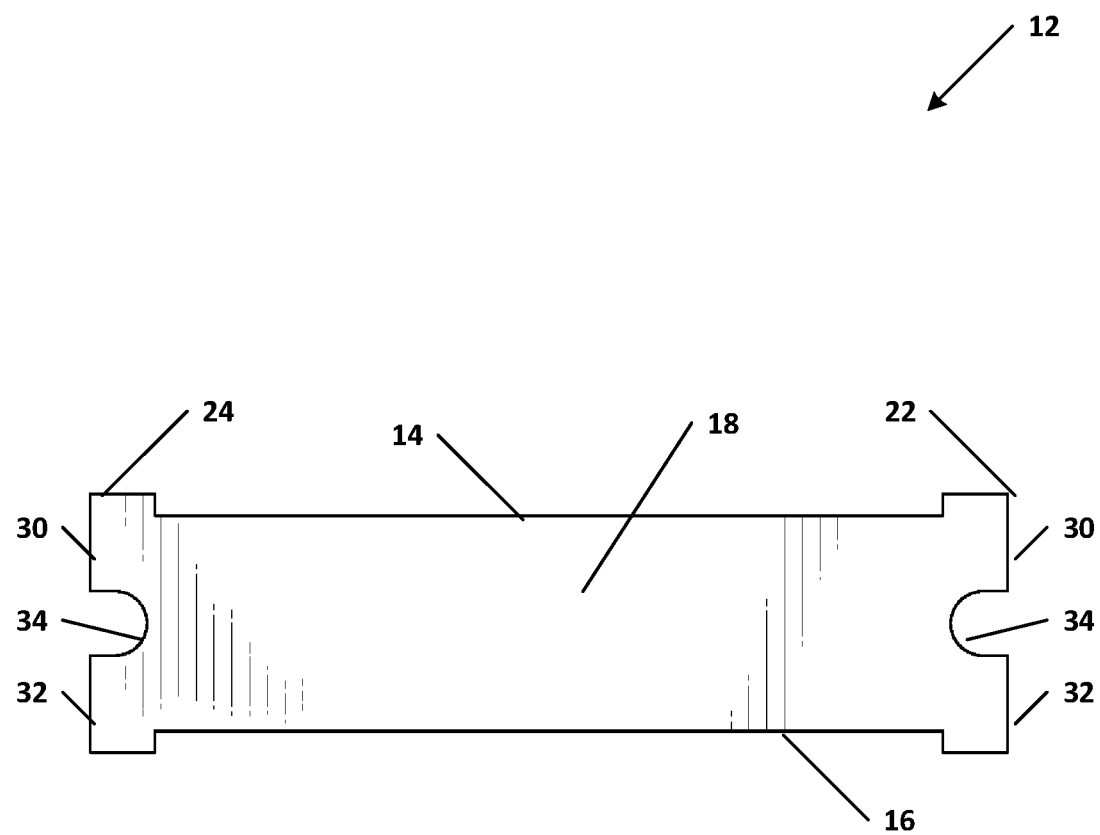
FIG. 2 is a rear view of a slot lock cribbing block, in accordance with one or more embodiments.
Figure 3:
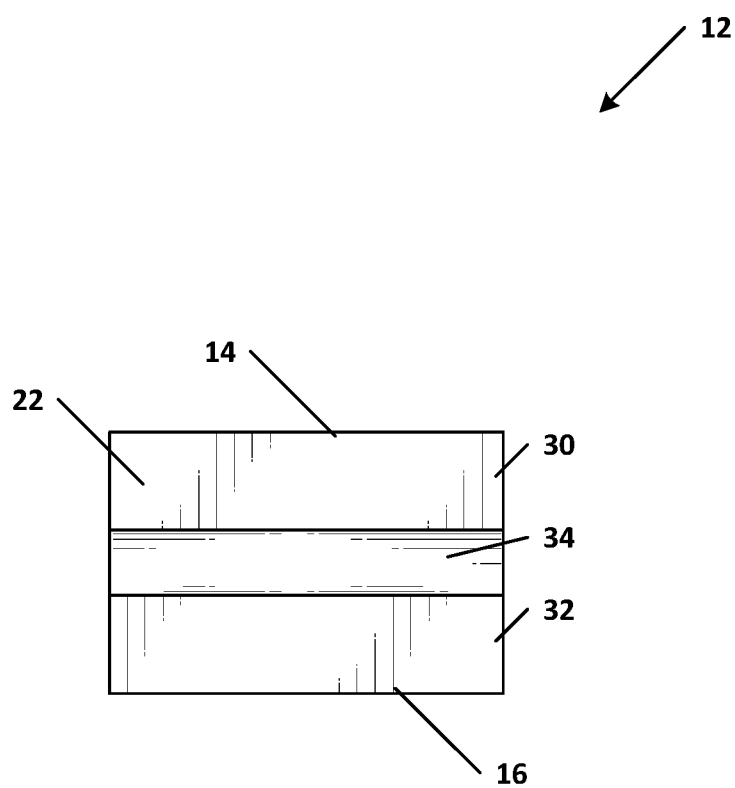
FIG. 3 is a right view of a slot lock cribbing block, in accordance with one or more embodiments.
Figure 4:
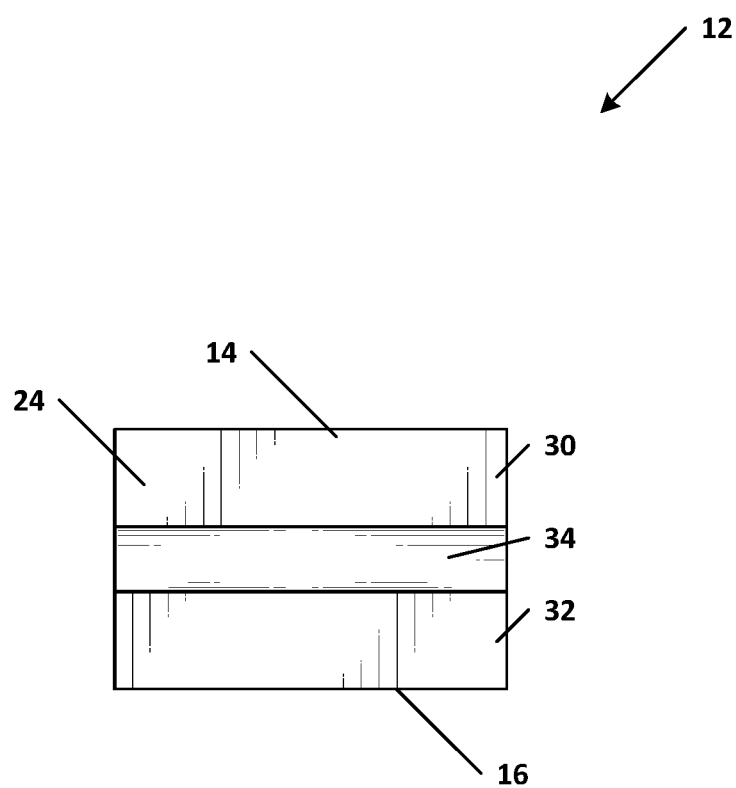
FIG. 4 is a left view of a slot lock cribbing block, in accordance with one or more embodiments.
Figure 5:
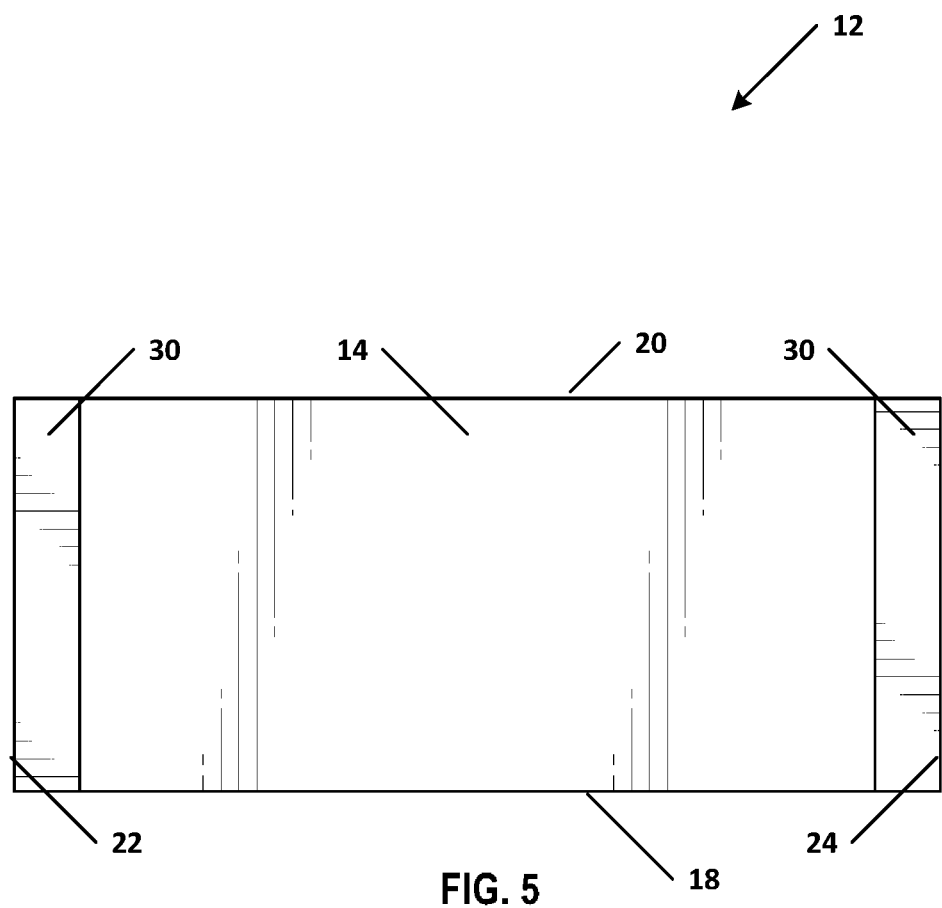
FIG. 5 is a top view of a slot lock cribbing block, in accordance with one or more embodiments.
Figure 6:
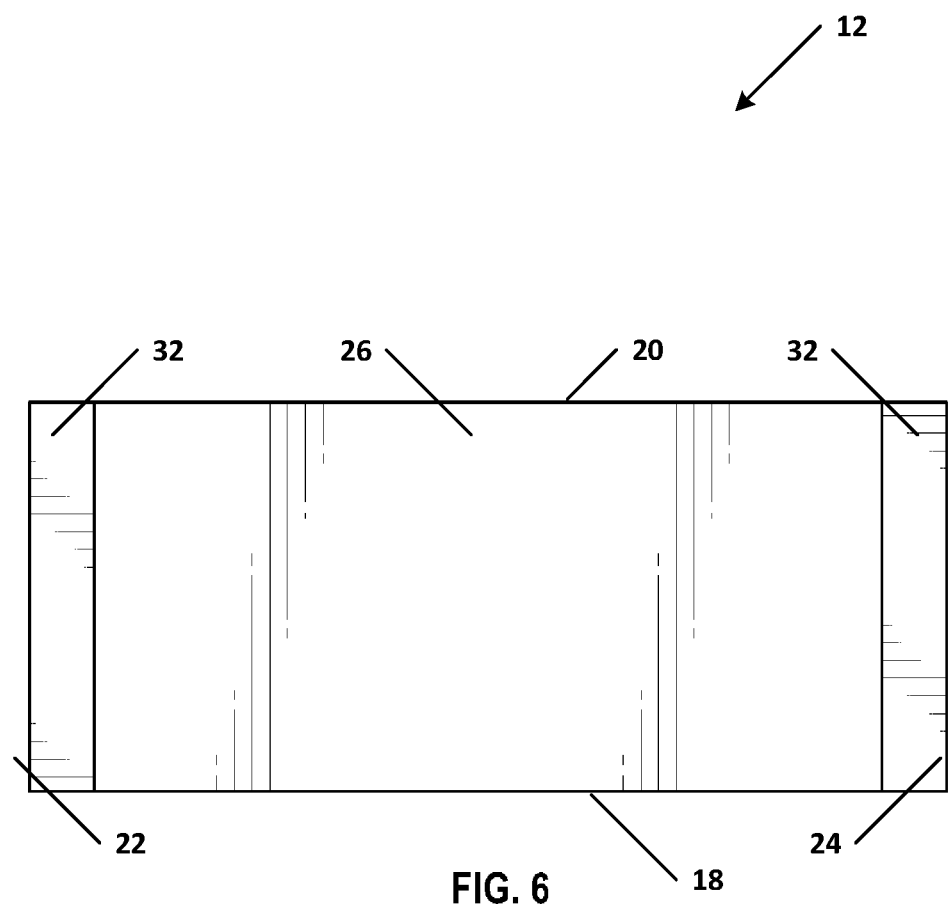
FIG. 6 is a bottom view of a slot lock cribbing block, in accordance with one or more embodiments.
Figure 7:
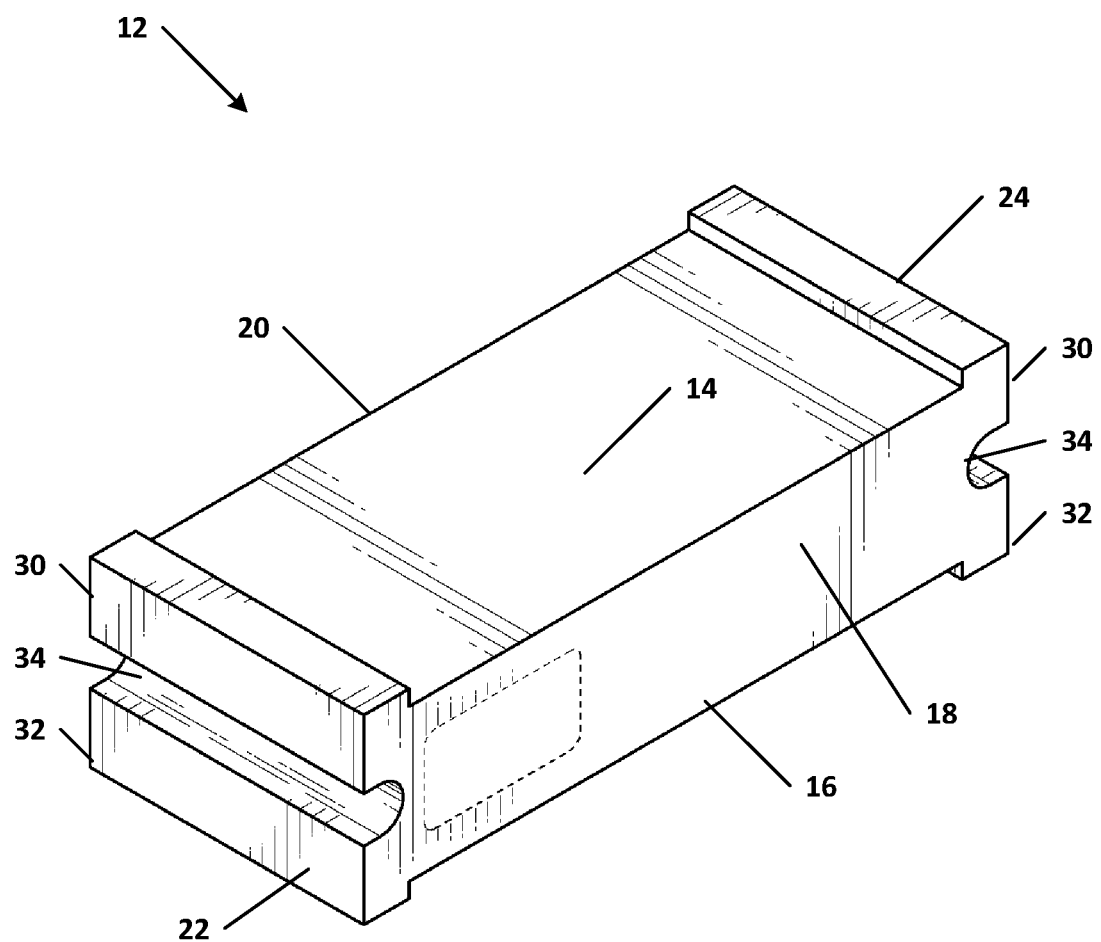
FIG. 7 is an upper front right perspective view of a slot lock cribbing block, in accordance with one or more embodiments.
Figure 8:
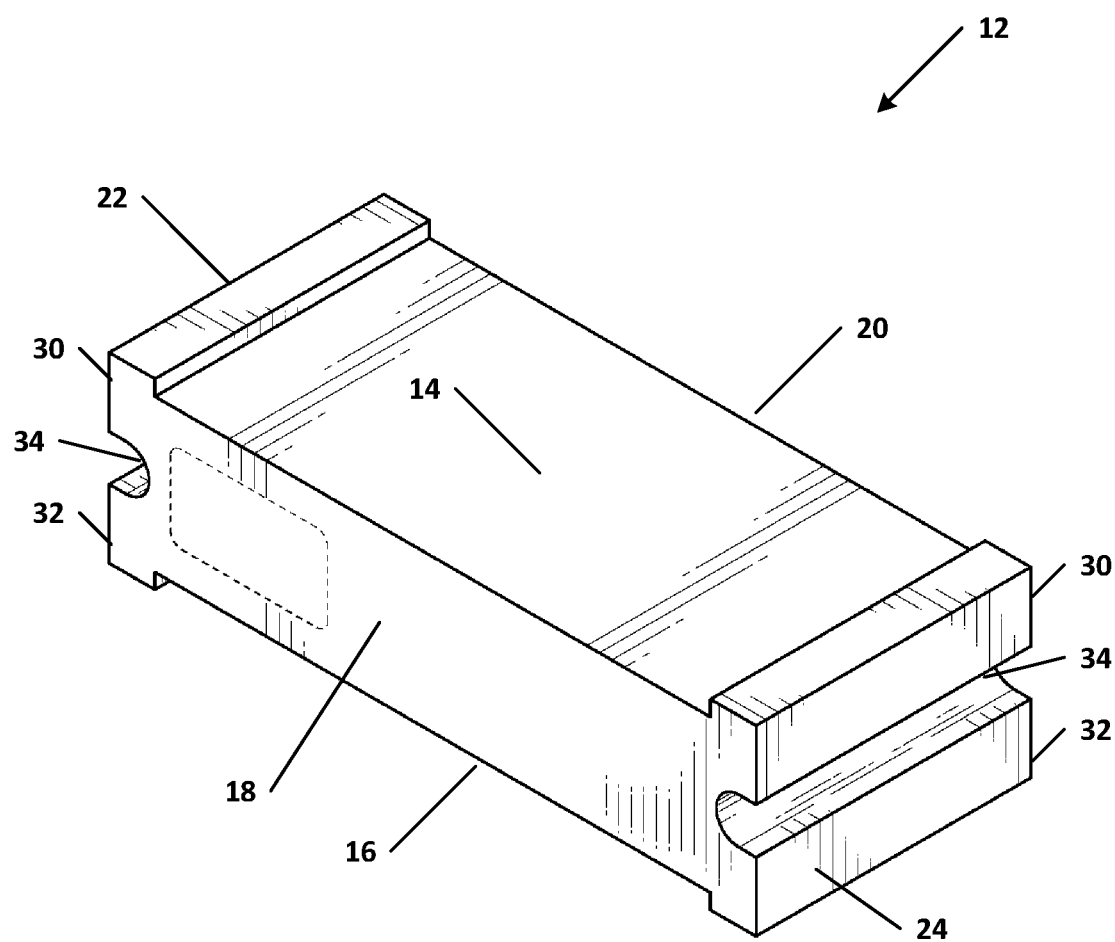
FIG. 8 is an upper front right perspective view of a slot lock cribbing block, in accordance with one or more embodiments.
Figure 9:
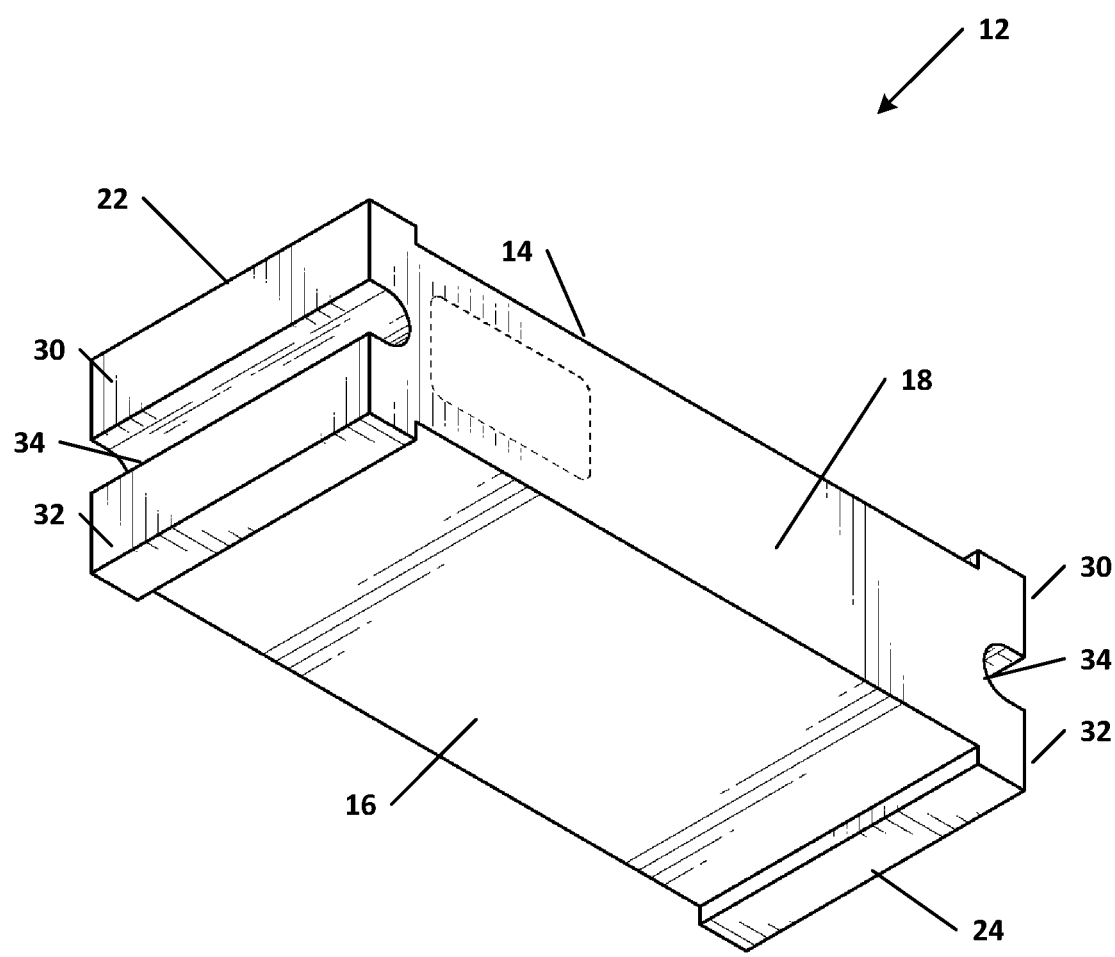
FIG. 9 is a lower front right perspective view of a slot lock cribbing block, in accordance with one or more embodiments.
Figure 10:
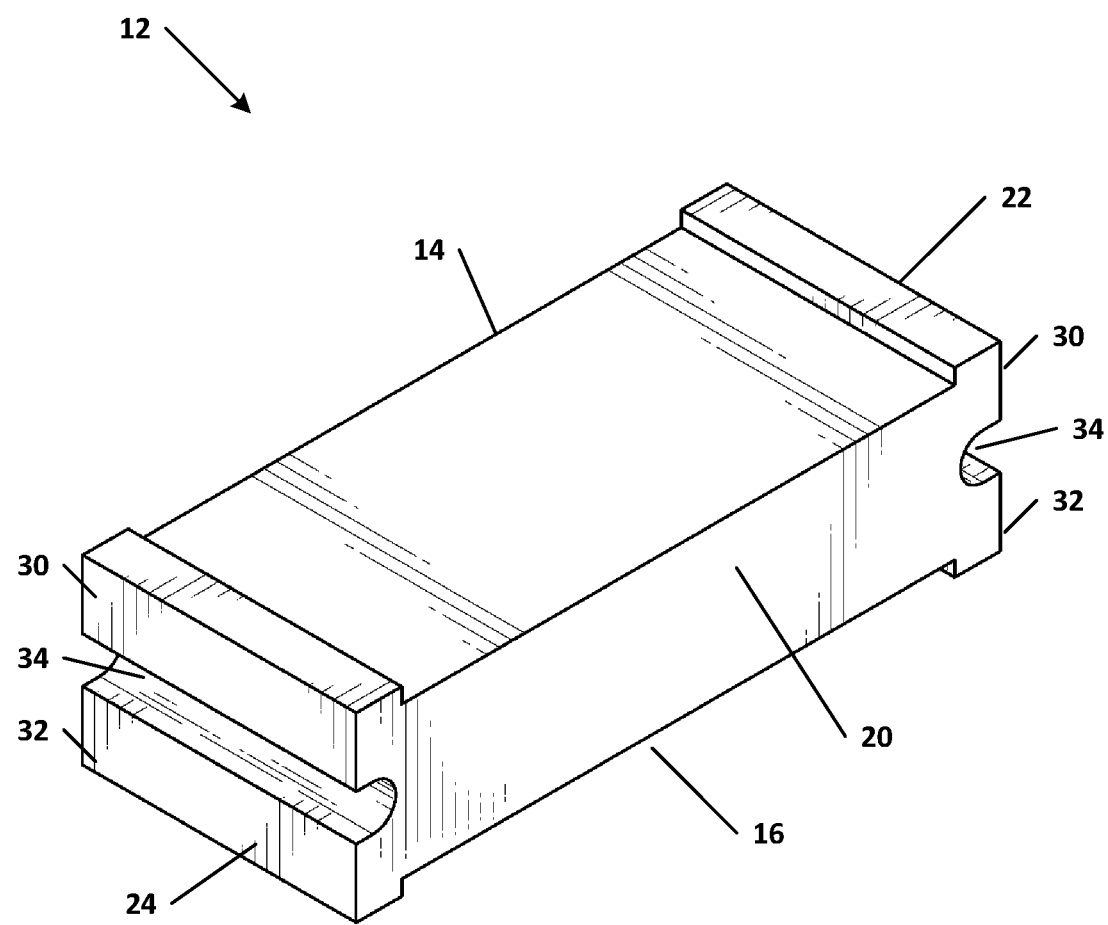
FIG. 10 is an upper rear left perspective view of a slot lock cribbing block, in accordance with one or more embodiments.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials or apparatuses, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

Various disclosed embodiments may be primarily described in the context of cribbing blocks for outriggers. However, the embodiments are not so limited. It is appreciated that the embodiments may be adapted for use in other applications which may be improved by the disclosed structures, arrangements and/or methods. The system is merely shown and described as being used in in the context of cribbing blocks for ease of description and as one of countless examples.

System:

With reference to the figures, a slot lock cribbing block system 10 (or simply system 10) is presented. System 10 is formed of any suitable size, shape and design and is configured to provide support for outriggers or feet of machinery in a quick, easy, safe, adjustable and stable manner. In the arrangement shown, as one example, the cribbing block system 10 has a plurality of blocks 12. In the arrangement shown, as one example, each block 12 has an upper surface 14, a lower surface 16, a front side 18, a back side 20, a left end 24 and a right end 22. In the arrangement shown, as one example, the cribbing block system 10 includes the following component pieces, among others: a plurality of blocks 12, bottom locking plate 26, and top locking plate 28 among other components.

Block:

Cribbing block system 10 includes a block 12 and preferably a plurality of blocks 12. Block 12 is formed of any suitable size, shape and design and is configured to support outriggers or feet of machinery. In the arrangement shown, as one example, block 12, is formed of a generally elongated member that extends a lateral length between ends 24, 22. Block 12 may be formed of a single, unitary member that is formed in a manufacturing process such as molding, casting, pressing, forming, additive formation, machining, or the like to form a unitary and monolithic member. Alternatively, block 12 may be formed of multiple pieces that are connected or assembled to one another such as through screwing, bolting, adhering, welding or the like manufacturing processes.

In the arrangement shown, as one example, when viewed from end 24 or end 22, block 12 has a generally rectangular or square shape with an upper surface 14, lower surface 16, front side 18, and back side 20. In the arrangement shown, as one example, each of the upper surface 14, lower surface 16, front side 18, and back side 20 are generally rectangular or square in shape and has a smooth, flat surface. In the arrangement shown, as one example, the generally flat planes formed by upper surface 14 and lower surface 16 extend in approximate parallel planar spaced relation to one another. Similarly, in the arrangement shown, as one example, the generally flat planes formed by front side 18, and back side 20 extend in approximate parallel planar spaced relation to one another. In the arrangement shown, as one example, the generally flat planes formed by upper surface 14 and lower surface 16 and the generally flat planes formed by front side 18, and back side 20, extend in approximate perpendicular planar spaced relation to one another.

In the arrangement shown, as one example, the block 12 has a pair of lips 30, 32. In an embodiment, the flat upper surface 14 has an upward extending lip 30 positioned at the opposing ends 24, 22 of the flat upper surface 14. Similarly, the flat lower surface 16 has a downward extending lip 32 positioned at opposing ends 24, 22. In the arrangement shown, as one example, lips 30, 32, when viewed from the side have a generally square or rectangular shape. However, any other shape is hereby contemplated for use.

Further, the block 12 may be symmetrical along a vertically extending center line. The block 12 may also be symmetrical along a horizontally extending center line.

In the arrangement shown, as one example, the block 12 has a handle 34 positioned in each opposing ends 24, 22. The handle 34 may be located on each opposing end 24, 22 between the upward extending lip 30 and the downward extending lip 32 spanning the distance between front side 18 and back side 20 of the block 12. Alternatively, the handles 34 may only extend partially between front side 18 and back side 20 on ends 24, 22. To accommodate the handle, the upward and downward extending lips 30, 32 may be spaced apart from each other by approximately more than twice the width of the block 12.

In the arrangement shown, as one example, when handle 34 is viewed from the side, handle 34 is formed of a generally semicircular shaped recess or cut-out that extends from the front side 18 to back side 20 length of block 12 in a generally continuous and uninterrupted manner.

Various arrangements may provide a number of advantages with respect to the use of a plurality of blocks 12 for a slot lock cribbing block system 10. One of the advantages of using a plurality of blocks 12 is that due to flat and stable construction of the blocks 12, the system 10 requires substantially less material to achieve adequate and safe distribution of the weight of the outriggers or feet of machinery. Using less material reduces the material cost. Another advantage of using a block 12 is that the tube may itself be formed by a faster and less expensive manufacturing process. That is, in one arrangement, the block 12 is formed by molding, extrusion, cutting, or shaping the material, preferably a recycled composite plastic material.

In addition, many formed blocks 12 formed of various materials are readily available on the market; however, these other formed blocks have the distinct disadvantage of not locking together to provide stable and desirable surface area for outriggers or feet of machinery. As such, another advantage provided by one or more arrangements is that the blocks 12 may be used with the system 10 to achieve a stable, flat surface area with maximum contact area and no gaps or contact points having higher pressure than others. In one or more arrangements, the system 10 is estimated to have a load capacity of at least 100,000 pounds depending on size and material. Avoiding the need to use existing formed blocks which do not provide maximum contact area provides a significant safety benefit to the operators of the machinery.

Bottom Locking Plate:

Cribbing block system 10 includes a bottom locking plate 26. Bottom locking plate 26 is formed of any suitable size, shape and design and is configured to support outriggers or feet of machinery. In the arrangement shown, as one example, bottom locking plate 26, has a flat upper surface 36. Within the flat upper surface 36 of the bottom locking plate 26 is a downward extending recess 38 positioned at the right end 40 and left end 42 of the flat upper surface 36 of bottom locking plate 26. In a further arrangement shown, as one example, the flat upper surface 36 further comprises a raised peripheral edge 44 extending around the flat upper surface 36 of the bottom locking plate 26. In a still further arrangement, as one example, the flat upper surface 36 further comprises a raised peripheral edge 44 extending around the flat upper surface 36 and downward extending recesses 38 of the bottom locking plate 26. The downward extending recesses 38 and raised peripheral edge 44 are configured to engage and retain a pair or plurality of blocks 12 therein in order to provide a stable base for outriggers or feet of machinery.

That is, downwardly extending recesses 38 are sized and shaped to receive downward extending lips 32 with close and tight tolerances. In this way, when blocks 12 are placed on top of a bottom locking plate 26, the downwardly extending recesses 38 receive and engage the downward extending lips 32 of blocks 12 with close and tight tolerances. That is, when blocks 12 are in place on top of bottom locking plate 26 lower surface 16 of blocks 12 is in flat and flush engagement with the upper surface of 36 of bottom locking plate 26 and the inward facing edges of opposing downward extending lips 32 engage or are placed adjacent to the outward facing edges of recesses 38, and the bottom surfaces of downward extending lips 32 are in flat and flush engagement with the bottom surfaces of recesses 38 and the opposing outward facing ends 24, 22 are in flat and flush engagement or adjacent to the opposing inward facing edges of recesses 38. Similarly, the front side 18 and rear side 20 of blocks 12 are positioned in flat and flush engagement or adjacent to inward facing side-edges of peripheral edge 44 of bottom locking plate 26. In this way, blocks 12 nest within bottom locking plate 26. In this way, bottom locking plate 26 provides alignment to blocks 12 as well as increased strength and stability. Installation in this manner helps to prevent shifting and movement of blocks 12 and helps to lock a pair of blocks 12 in place.

In the arrangement shown, as one example, when viewed from above or below, bottom locking plate 26 has a generally square or rectangular peripheral shape. In the arrangement shown, as one example, bottom locking plate 26 has a generally flat and planar bottom surface that extends in approximate parallel planar spaced relation to flat upper surface 36 of bottom locking plate 26.

As an alternative arrangement, the configuration described here in as bottom locking plate 26 may be used as a top locking plate 28 additionally or alternatively.

Top Locking Plate:

Cribbing block system 10 includes a top locking plate 28. Top locking plate 28 is formed of any suitable size, shape and design and is configured to support outriggers or feet of machinery. In the arrangement shown, as one example, top locking plate 28, has a generally flat upper surface 46 and a generally flat bottom surface 48 that extend in approximate parallel planar spaced relation to one another. In a further arrangement, as shown, top locking plate 28 possesses dimensions sufficient to allow the flat bottom surface 48 to be placed on the flat upper surface 14 of a pair of blocks 12 between the pair of opposing upwardly extending lips 30 when a pair of blocks 12 are placed in side-by-side alignment. The top locking plate 28 is designed to provide additional stability to the cribbing block system 10 by locking the top-most pair of blocks 12 and providing a flat surface to stably support outriggers or feet of machinery.

In the arrangement shown, as one example, when viewed from above or below, top locking plate 28 has a generally square or rectangular peripheral shape that is sized and shaped to fit within the recess between opposing upward extending lips 30 of a pair of side-by-side blocks 12. In this way, when top locking plate 28 is placed on top of a pair of blocks 12, the outward edges of top locking plate 28 engage or are placed adjacent to the inward facing edges of opposing upward extending lips 30. Installation in this manner helps to prevent shifting and movement of blocks 12 and helps to lock a pair of blocks 12 in place.

In one or more arrangements, top locking plate 28 is formed of a compressible material to promote secure connection between top locking plate 28 and the topmost pair of blocks 12 as well as between top locking plate 28 and items placed thereon. In some various arrangements, such compressible material may include but is not limited to, for example, a rubber, a synthetic rubber, a rubber composite, a silicone, a plastic, a foam, a polyurethane, or any other compressible and flexible material or any combination thereof. Additionally or alternatively, top locking plate 28 may be placed below bottom locking plate 26 to facilitate secure connection between bottom locking plate 26 and the floor surface that system 10 is placed upon.

In an alternative arrangement, a bottom locking plate 26 may be used to be placed on top of the top side of the top pair of blocks 12. In this arrangement, the bottom locking plate 26 provides all of the advantages described herein, only in this arrangement on the top side of blocks 12.

As an alternative arrangement, the configuration described here in as top locking plate 28 may be used as a bottom locking plate 26 additionally or alternatively.

Figure 11:
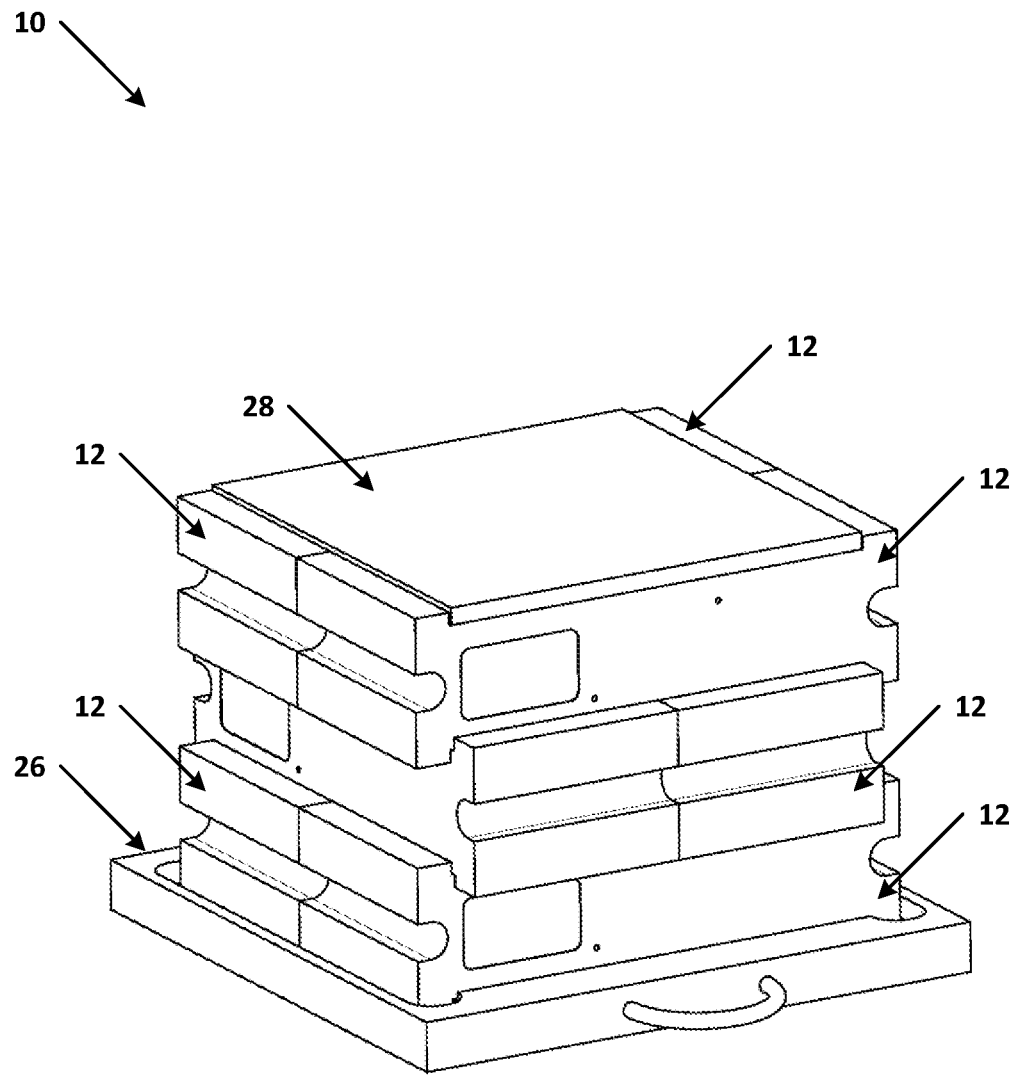
FIG. 11 is a perspective view of a slot lock cribbing block system, in accordance with one or more embodiments; the view showing a plurality of slot lock cribbing blocks stacked on top of one another and stacked on top of a bottom locking plate and covered by a top locking plate.
Figure 12:
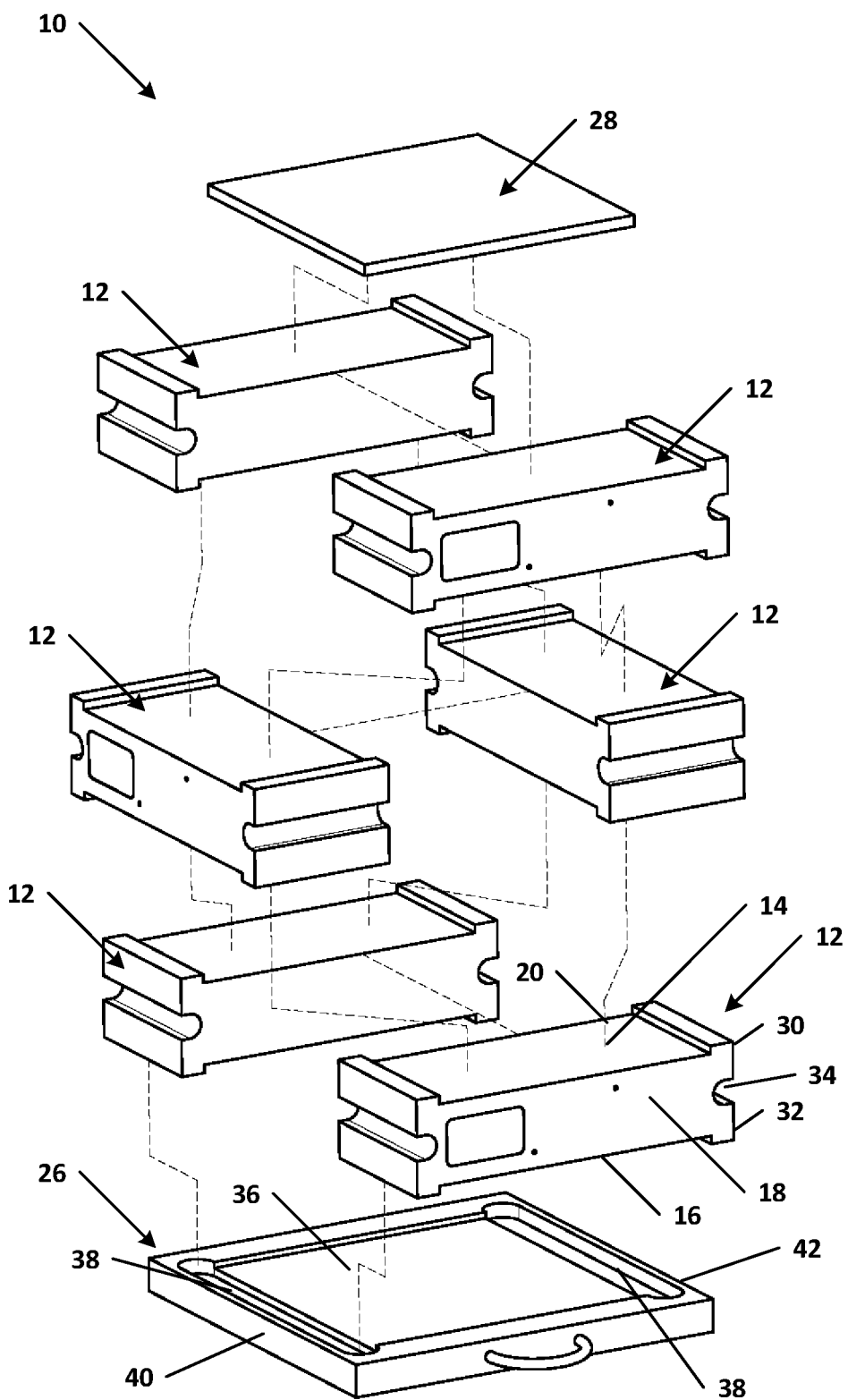
FIG. 12 is a perspective view of a slot lock cribbing block system, in accordance with one or more embodiments; the view showing an exploded view of a plurality of slot lock cribbing blocks configured to be stacked on top of one another and stacked on top of a bottom locking plate and covered by a top locking plate.
Figure 13:
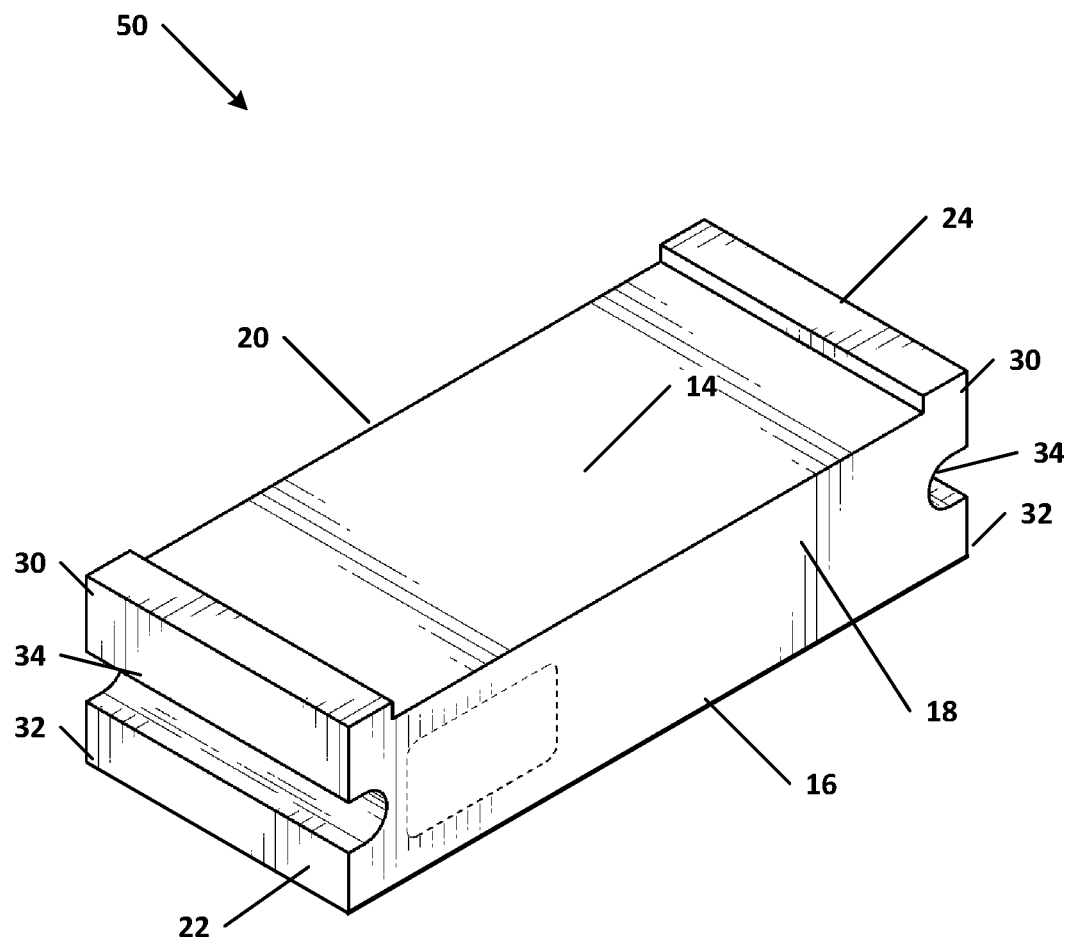
FIG. 13 is an upper front right perspective view of a slot lock cribbing block, in accordance with one or more embodiments.
Figure 14:
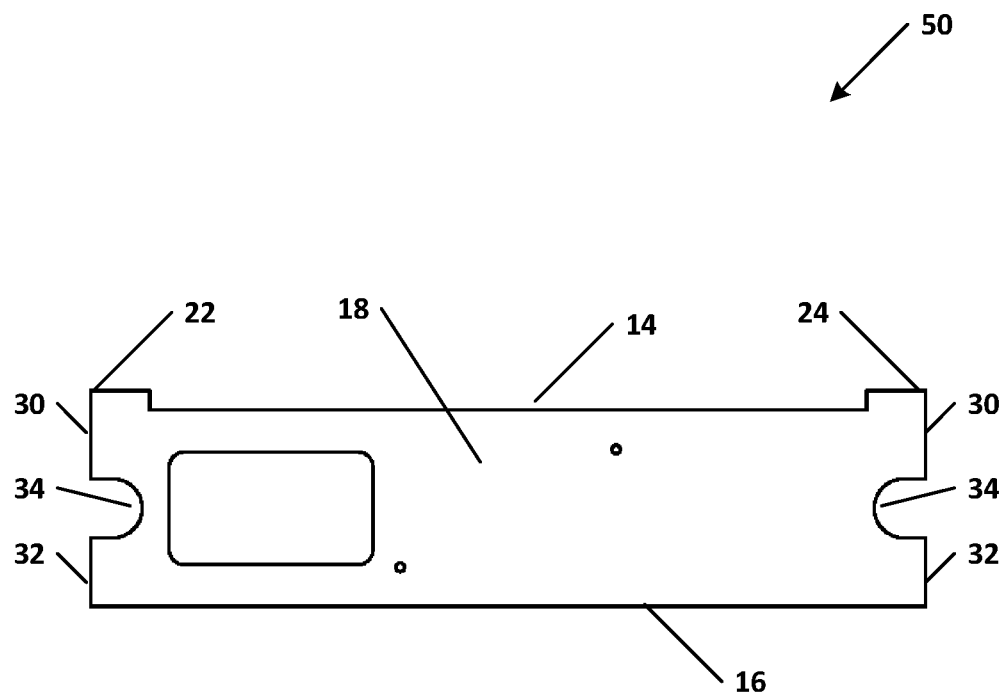
FIG. 14 is a front view of a slot lock cribbing block which, along with other slot lock cribbing blocks, provides a heightened platform for outrigger stabilizers or feet, in accordance with one or more embodiments.
Figure 15:
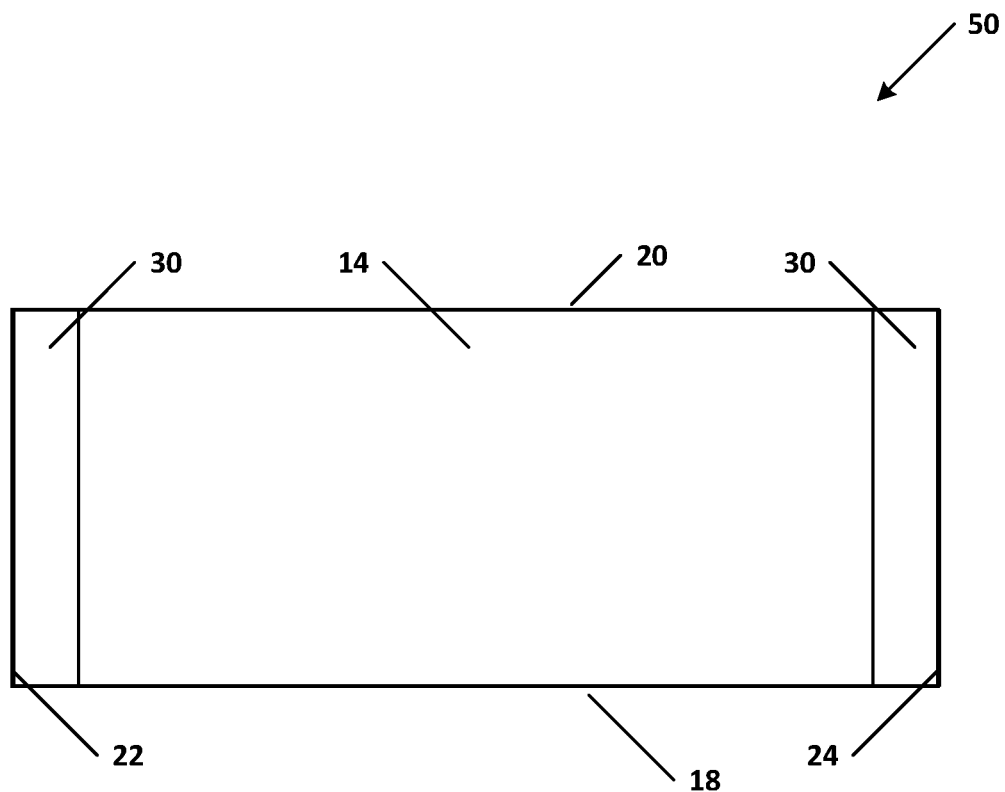
FIG. 15 is a top view of a slot lock cribbing block, in accordance with one or more embodiments.
Figure 16:
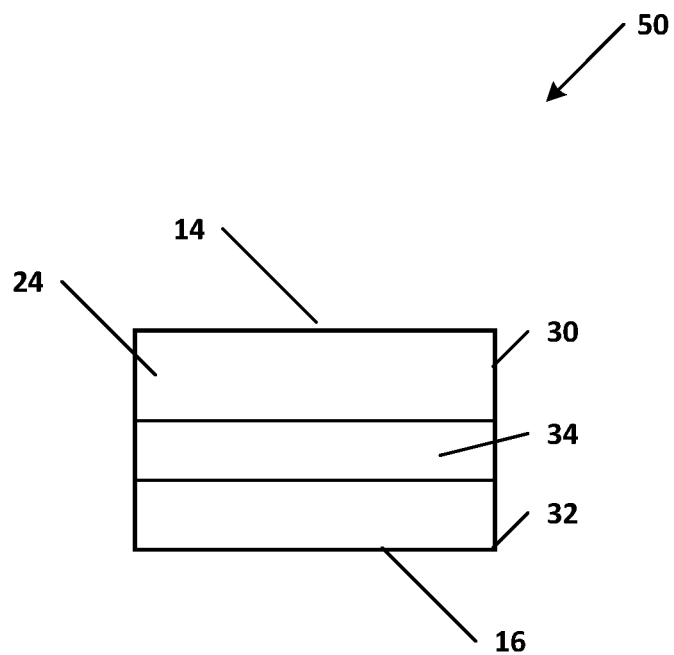
FIG. 16 is a left view of a slot lock cribbing block, in accordance with one or more embodiments.

In Operation:

In the arrangement shown in FIGS. 11 and 12, as one example, the slot lock cribbing block system 10 comprises a plurality of blocks 12, a top locking plate 28, and a bottom locking plate 26. A first pair of blocks 12 are configured to be stacked in side by side alignment on the bottom locking plate 26 such that the downward extending lips 32 of the first pair of blocks 12 are received in the downward extending recesses 38 of the bottom locking plate 26, and the flat lower surface 16 of the first pair of blocks 12 engages the flat upper surface 36 of the bottom locking plate 26. The flat bottom surface 48 of the top locking plate 28 is configured to be placed on the flat upper surface 14 of a pair of side by side blocks 12 between the pair of upward extending lips 30. The top locking plate 28 then provides maximum contact area with improved stability for an outrigger or feet of machinery. In an aspect of the disclosure, maximum contact area is provided by the top locking plate 28 and no gaps occur within the system 10, and no contact points between the top locking plate 28 and the outrigger have higher pressure than other contract points. The system 10 is estimated to have a load capacity of at least 100,000 pounds, in some arrangements. Such improved contract area and the elimination of gaps within the system provides a significant safety benefit to the operators the machinery. In addition, the locking nature of the bottom locking plate 26, blocks 12 and top locking plate 28 help to prevent shifting and lateral movement under dynamic forces which improves safety and stability.

In a further arrangement, as one example, a second pair of blocks 12 are configured to be stacked in side by side alignment on the first pair of blocks 12 such that the downward extending lips 32 of the second pair of blocks 12 extend over a side 18, 20 of the first pair of blocks 12, and the flat lower surface 16 of the second pair of blocks 12 engages the flat upper surface 14 of the first pair of blocks 12. That is, the second pair of blocks 12 are rotated at ninety-degrees to the first pair of blocks 12 along a Z-axis. When stacked in this manner, the upward extending lips 30 of the first pair of blocks 12 extend over a side 18, 20 of the second pair of blocks 12. When stacked in this manner, the downward extending lips 32 of the second pair of blocks 12 extend over a side 18, 20 of the first pair of blocks 12. In this way, the first set of blocks 12 and the second set of blocks 12 nest within each other. This nesting helps to help to prevent shifting and lateral movement under dynamic forces which improves safety and stability.

Any number of pairs of blocks 12 may be installed and assembled in this manner with each set of blocks 12 being rotated ninety-degrees to the below pair of blocks 12 as well as the above pair of blocks 12, when present. This nesting alignment is held in place by the bottom locking plate 26 as well as the top locking plate 28, when present.

Although the disclosed arrangements are primarily described and illustrated with reference to sets of blocks having uniform size, embodiments are not so limited. Rather, it is contemplated that, in one or more arrangements, system 10 may include sets of blocks 12 having multiple different sizes. For example, in one or more arrangement, system may include a first set of blocks 12 that are taller and a second set of blocks 12 that are shorter. The shorter blocks 12 may be used for example to fill in a remaining gap between an outrigger and when the remaining gap is too small to fit another layer of the taller first set of blocks.

Alternative Arrangement:

With reference to FIGS. 13-16 various additional features and alternatives of system 10 are presented. The features of the cribbing block 50 presented in FIGS. 13-16 are similar to features presented in cribbing block 12 of FIGS. 1-12 and therefore all of the teaching presented herein with respect to FIGS. 1-12 applies equally to and is incorporated into the teaching presented in FIGS. 13-16 unless specifically stated otherwise.

FIGS. 13-16 show an alternative cribbing block 50 that may be used in a cribbing block system 10. The cribbing block 50 shown in FIGS. 13-16 is similar to cribbing block 12 shown in FIGS. 1-12, with the primary difference being that either the top surface 14 or bottom surface 16 of the block 50 is flat whereas the top surface 14 and bottom surfaces 16 of block 12 are not. Or said another way, top surface 14 or bottom surface 16 lack lip 30 that extend upward or downward, respectively.

In this arrangement, the cribbing blocks 50 may be used as base or bottom most blocks and/or top most blocks in system 10. When cribbing blocks 50 are used as bottom most blocks they may sit directly on the floor or ground in lieu of a bottom locking plate 26. This arrangement may be particularly useful when system 10 is placed on a flat stable surface such as a concrete floor. Similarly, when cribbing blocks 50 are used as top most blocks the weight they are supporting may be placed directly on top of the top surface of the cribbing blocks 50.

When cribbing block 50 is used as a base block or bottom most block, the flat bottom surface 16 provides a stable footing without the need for bottom locking plate 26. Conversely, when cribbing block 50 is used as a top most block in system 10, the flat top surface 14 provides a flat surface for support of an object without the need for top locking plate 26. Alternatively, when cribbing blocks 50 are used as bottom most blocks they may be placed on top of bottom locking plate 26 and received within a recess 38 in the upper surface 36 that is sized and shaped to fit around the periphery of the bottom surface of cribbing blocks 50 thereby locking the bottom cribbing blocks 50 together and providing a flat lower surface configured to sit on the floor or ground in a flat and flush manner thereby providing a stable support surface. Additionally or alternatively, cribbing blocks 50 may be used with bottom locking plate 26 that does not include side recesses 28 to accommodate downward extending lip 32. Alternatively, in one or more arrangements when cribbing blocks 50 are used as bottom most blocks they may be placed on top of a flexible pad formed of a to facilitate between contact between cribbing blocks 50 and floor and prevent slipping. Such compressible material may include but is not limited to, for example, a rubber, a synthetic rubber, a rubber composite, a silicone, a plastic, a foam, a polyurethane, or any other compressible and flexible material or any combination thereof. Similarly, when cribbing blocks 50 are used as top most the arrangement just described may be inverted. That is, when cribbing blocks 50 are used as top most blocks bottom locking plate 26 may be placed on top of the top most cribbing blocks 50 which are received within a recess 38 in the, inverted, upper surface 36 that is sized and shaped to fit around the periphery of the top surface of cribbing blocks 50 thereby locking the top cribbing blocks 50 together and providing a flat upper surface configured to support a weight thereby providing a stable support surface. Alternatively, a top locking plate 28 may be used on top of the flat surface of cribbing blocks 50 or under the flat surface of cribbing blocks.

From the above discussion it will be appreciated that the slot lock cribbing block system 10 and related methods of use, presented herein improves upon the state of the art. Specifically, the slot lock cribbing block system 10 and related methods of use are presented that: improves upon the state of the art; reduces cost over existing arrangements; facilitates the use of interlocking blocks; allows for the use of interlocking blocks to provide a stable platform with maximum contract; that facilitates use of less expensive materials; that reduces the complexity of the manufacturing process; that reduces the amount of time required to manufacture; that reduces the amount of machine time required to manufacture the product; that is easy to assemble; that has a relatively foolproof design; that is easy to use; that is simple in design; that is relatively inexpensive or affordable; and/or that has a minimum number of parts; among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A cribbing block system for supporting an outrigger, the system comprising:
   a block;
   the block having a top surface;
   the block having a bottom surface;
   the block having a front side;
   the block having a back side;
   the block having a first end;
   the block having a second end;
   the block having an upward extending lip positioned in the first end;
   the block having an upward extending lip positioned in the second end;
   the block having a downward extending lip positioned in the first end;
   the block having a downward extending lip positioned in the second end;
   the block having a handle positioned in the first end;
   the block having a handle positioned in the second end;
   wherein the top surface and bottom surface extend parallel to one another and perpendicular to the front side and back side;
   wherein the front side and back side extend parallel to one another and perpendicular to the top surface and bottom surface;
   wherein the upward extending lip in the first end and the upward extending lip in the second end extend above the top surface of the block;
   wherein the downward extending lip in the first end and the downward extending lip in the second end extend below the bottom surface of the block;
   wherein the handle in the first end is located between the upward extending lip in the first end and downward extending lip in the first end;
   wherein the handle in the first end is formed of a recess positioned in the first end of the block;
   wherein the handle in the second end is located between the upward extending lip in the second end and downward extending lip in the second end;
   wherein the handle in the second end is formed of a recess positioned in the second end of the block.

2. The cribbing block of claim 1, wherein the block is generally square or rectangular in shape.

3. The cribbing block of claim 1, wherein the top surface, bottom surface, front side, back side, first end, and second end form a generally square or rectangular shape.

4. The cribbing block of claim 1, wherein the first end is a left end or a right end.

5. A slot lock cribbing block system for supporting an outrigger, comprising:
a plurality of blocks;
a top locking plate; and
a bottom locking plate;
wherein the plurality of blocks are stacked in pairs on top of the bottom locking plate;
wherein the top locking plate is placed on top of the plurality of blocks that are stacked in pairs;
wherein each pair of blocks is rotated 90 degrees around a z-axis relative to an immediately above or below pair of blocks;
wherein the bottom locking plate comprises a top, a bottom, a front, a back, a first side and a second side surfaces and includes a recess that receives a bottom pair of blocks therein.

6. The slot lock cribbing block system of claim 5, wherein each block of the plurality of blocks includes:
a top surface;
a bottom surface;
a front side;
a back side;
a first end;
a second end;
an upward extending lip positioned in the first end;
an upward extending lip positioned in the second end;
a downward extending lip positioned in the first end;
a downward extending lip positioned in the second end;
a handle positioned in the first end;
a handle positioned in the second end;
wherein the top surface and bottom surface extend parallel to one another and perpendicular to the front side and back side;
wherein the front side and back side extend parallel to one another and perpendicular to the top surface and bottom surface;
wherein the upward extending lip in the first end and the upward extending lip in the second end extend above the top surface;
wherein the downward extending lip in the first end and the downward extending lip in the second end extend below the bottom surface;
wherein the handle in the first end is located between the upward extending lip in the first end and downward extending lip in the first end;
wherein the handle in the second end is located between the upward extending lip in the second end and downward extending lip in the second end.

7. The slot lock cribbing block system of claim 5, wherein each block of the plurality of blocks is generally square or rectangular in shape.

8. The slot lock cribbing block system of claim 5, wherein each block of the plurality of blocks has a top surface, a bottom surface, a front side, a back side, a first end, and a second end of each block of the plurality of blocks that form a generally square or rectangular shape.

9. The slot lock cribbing block system of claim 5, wherein the top locking plate comprises a top, bottom, front, back, first side, and second side surfaces.

10. The slot lock cribbing block system of claim 5, wherein the bottom locking plate comprises a top, bottom, front, back, first side and second side surfaces.

11. The slot lock cribbing block system of claim 5, wherein the bottom locking plate further comprises a handle.

12. The slot lock cribbing block system of claim 5, further comprising:
a recess positioned within a top surface of the bottom locking plate.

13. A slot lock cribbing block system for supporting an outrigger, comprising:
a plurality of blocks; a top locking plate;
a bottom locking plate; and
a recess positioned within a top surface of the bottom locking plate;
wherein the plurality of blocks are stacked in pairs on top of the bottom locking plate;
wherein the top locking plate is placed on top of the plurality of blocks that are stacked in pairs;
wherein each pair of blocks is rotated 90 degrees around a z-axis relative to an immediately above or below pair of blocks;
wherein the bottom locking plate comprises a top, a bottom, a front, a back, a first side and a second side surfaces and includes a recess that receives a bottom pair of blocks therein;
wherein the recess is of suitable shape to receive a downward extending lip of at least two blocks.

14. The slot lock cribbing block system of claim 13, further comprising:
wherein the recess is of suitable shape to receive a downward extending lip of at least two blocks;
wherein the system is assembled in following manner:
the bottom locking plate is placed on the ground;
a first block and second block are placed on top of the bottom locking plate so that a downward extending lip of the first block and a downward extending lip of the second block rest within the recess of the bottom locking plate;
a third block and fourth block are rotated 90 degrees around a z-axis and placed on top of the first block and second block; and
the top locking plate is placed on top of the blocks when desired height is reached.

15. A stackable pad system, comprising:
a plurality of blocks;
each block having a flat upper surface with an upward extending lip positioned at each opposing end of the flat upper surface;
each block having a flat lower surface with a downward extending lip positioned at each opposing end of the flat lower surface;
each block having a front side and a back side;
a bottom locking plate;
the bottom locking plate having a flat upper surface;
the bottom locking plate having a downward extending recess positioned at opposing ends of the flat upper surface
a first pair of blocks configured to be stacked in side by side alignment on the bottom locking plate such that the downward extending lips of the first pair of blocks are received in the downward extending recesses of the bottom locking plate, and the flat lower surface of the first pair of blocks engages the flat upper surface of the bottom locking plate;
a top locking plate;
the top locking plate having flat upper surface;
the top locking plate having a flat bottom surface;
wherein the flat bottom surface of the top locking plate is configured to be placed on the flat upper surface of a pair of side by side blocks.

16. The system of claim 15, wherein the top locking plate is configured to be placed on the flat upper surface of a pair of side by side blocks between a pair of the upward extending lips.

17. The system of claim 15, further comprising a second pair of blocks configured to be stacked in side by side alignment on top of the first pair of blocks such that the downward extending lips of the second pair of blocks extend over a side of the first pair of blocks, and the flat lower surface of the second pair of blocks engages the flat upper surface of the first pair of blocks.

18. The system of claim 15, further comprising a second pair of blocks configured to be stacked in side by side alignment on top of the first pair of blocks such that the upward extending lips of the first pair of blocks extend over a side of the second pair of blocks, and the flat upper surface of the first pair of blocks engages the flat lower surface of the second pair of blocks.

19. The system of claim 15, further comprising a second pair of blocks configured to be stacked in side by side alignment on top of the first pair of blocks such that the downward extending lips of the second pair of blocks extend over a side of the first pair of blocks, and the flat lower surface of the second pair of blocks engages the flat upper surface of the first pair of blocks, wherein the second pair of blocks are aligned in perpendicular alignment to the first pair of blocks.

20. The system of claim 15, wherein each block is symmetric along a vertically extending center line.

21. The system of claim 15, wherein each block is symmetric along a horizontally extending center line.

22. The system of claim 15, further comprising a handle positioned in each opposing end.

23. The system of claim 15, further comprising a handle positioned in each opposing end, wherein the handle is a recess.

24. The system of claim 15, further comprising a raised peripheral edge extending around the flat upper surface of the bottom locking plate.

25. The system of claim 15, further comprising a raised peripheral edge extending around the flat upper surface and downward extending recesses of the bottom locking plate.

* * * * *